(12) United States Patent
Hurwitz (10) Patent No.: US 8,006,705 B2
(45) Date of Patent: *Aug. 30, 2011

(54) PNEUMATIC HAIRBRUSH FOR PETS AND PEOPLE THAT RELEASES ACTIVE INGREDIENTS IN POWDER FORM

(75) Inventor: Marni Markell Hurwitz, Far Hills, NJ (US)

(73) Assignee: Ididit, Inc., Far Hills, NJ (US)

( * ) Notice: Subject to any disclaimer, the term of this patent is extended or adjusted under 35 U.S.C. 154(b) by 644 days.

This patent is subject to a terminal disclaimer.

(21) Appl. No.: 11/710,829

(22) Filed: Feb. 26, 2007

(65) Prior Publication Data

US 2008/0202544 A1    Aug. 28, 2008

Related U.S. Application Data

(63) Continuation-in-part of application No. 11/710,848, filed on Feb. 26, 2007, now Pat. No. 7,694,687, which is a continuation-in-part of application No. 11/349,638, filed on Feb. 8, 2006, now Pat. No. 7,322,364, which is a continuation-in-part of application No. 11/186,583, filed on Jul. 21, 2005, now Pat. No. 7,337,784.

(51) Int. Cl.
*A45D 24/22* (2006.01)
(52) U.S. Cl. .................................................. 132/116
(58) Field of Classification Search .............. 132/114, 132/298, 299, 293, 212, 112, 113, 115, 116, 132/297, 307; 401/184, 280, 186, 84, 287; 119/605, 602, 611, 612, 600; 15/186, 194
See application file for complete search history.

(56) References Cited

U.S. PATENT DOCUMENTS

| | | | | |
|---|---|---|---|---|
| 1,607,674 A * | 11/1926 | De Shazo Ives | ............... | 132/114 |
| 2,952,027 A * | 9/1960 | Caldwell | .......................... | 401/28 |
| 3,256,550 A * | 6/1966 | Laxalt | ............................ | 401/141 |
| 4,143,982 A * | 3/1979 | Cox et al. | ....................... | 401/280 |
| 4,244,076 A | 1/1981 | Meyer | .............................. | 15/188 |
| 4,944,625 A * | 7/1990 | Futter et al. | .................... | 401/153 |
| 5,150,491 A | 9/1992 | Ikemoto | ......................... | 15/1.52 |
| 5,261,426 A | 11/1993 | Kellett et al. | ................. | 132/108 |
| 5,297,882 A * | 3/1994 | Kornides | ........................ | 401/184 |
| 5,626,099 A | 5/1997 | Staller et al. | .................. | 119/625 |
| 5,632,289 A * | 5/1997 | Sharp | ............................. | 132/116 |
| 5,762,433 A * | 6/1998 | Cary | .............................. | 401/184 |
| 5,975,089 A * | 11/1999 | Simon | ............................ | 132/113 |
| 6,006,395 A * | 12/1999 | Tiramani et al. | .............. | 15/176.1 |
| 6,022,163 A * | 2/2000 | Asfur | ............................. | 401/175 |

(Continued)

*Primary Examiner* — Todd E Manahan
*Assistant Examiner* — Brianne O'Neill
(74) *Attorney, Agent, or Firm* — Ernest D. Buff; Ernest D. Buff & Associates, LLC (57) ABSTRACT

A pneumatic hairbrush for people and pets releases a powder mixture containing perfume, fragrance and/or other active compositions directly onto the hair or fur during brushing. The brush includes a flexible deformable membrane that carries brush bristles and has a plurality of apertures for delivery of the active composition and is fitted within a first opening of an internal cavity in a brush base. The powder mixture containing the active ingredient is poured into the internal cavity and disseminates over the flexible deformable membrane. A cover is inserted through a second opening. Delivery of the powder mixture is activated during brushing or through manually depressing, where the flexible deformable membrane is deformed and compresses the internal cavity causing the powder mixture to be pneumatically forced within the plurality of apertures of the brush bristles or around the outside surfaces of the bristles, and released.

18 Claims, 6 Drawing Sheets

U.S. PATENT DOCUMENTS

| | | | |
|---|---|---|---|
| 6,367,421 B1 * | 4/2002 | Deacon | 119/603 |
| 6,450,127 B2 | 9/2002 | Willinger et al. | 119/663 |
| 6,543,388 B2 | 4/2003 | Willinger et al. | 119/663 |
| 6,575,174 B2 | 6/2003 | Lee | 132/160 |
| 6,618,893 B1 * | 9/2003 | Wang | 15/186 |
| 7,044,137 B2 * | 5/2006 | Glucksman et al. | 132/114 |

\* cited by examiner

PNEUMATIC HAIRBRUSH FOR PETS AND PEOPLE THAT RELEASES ACTIVE INGREDIENTS IN POWDER FORM

This is a Continuation-In-Part of application bearing Ser. No. 11/710848, filed of Feb. 26, 2007 now U.S. Pat. No. 7,694,687, for "Direct Application Brush For Horses And Livestock That Releases Active Ingredients" which, in turn, is a Continuation-In-Part of application Ser. No. 11/349,638, filed Feb. 8, 2006 now U.S. Pat. No. 7,322,364, for "Hairbrush for Pets and People that Releases Active Ingredients" which, in turn, is a Continuation-In-Part of application Ser. No. 11/186,583, filed Jul. 21, 2005 now U.S. Pat. No. 7,337,784, for "Hairbrush for Pets and People that Releases Active Ingredients", the disclosures of which are hereby incorporated in their entirety by reference thereto.

BACKGROUND OF THE INVENTION

1. Field of the Invention

The present invention relates to a hairbrush for pets and people; and more specifically to a pneumatic hairbrush that releases during brushing a powder mixture containing active ingredients which include fragrance, therapeutic or moisturizing compounds, antibacterial compounds, insect repellant, flea and/or tic compounds, hair shampoos, hair conditioning products, dye compositions or other hair-related products.

2. Description of the Prior Art

Many patents address issues related to hairbrush designs that incorporate a number of bristles for providing desired brushing action. Brushes for pets typically incorporate stiff bristles, while those for humans are typically provided with softer bristles. Several patents disclose coating bristles with desired compositions in order to deliver these compositions to the brushed hair.

U.S. Pat. No. 4,244,076 to Meyer discloses a method and forming tool for the fabrication of a bristle support for a brush, especially a hairbrush. This method is for attaching pin-like bristles to a bristle support or carrier for a hairbrush. In a first step the rows of bristle pins are interconnected with one another at their rear end by means of a web. The individual bristle pin rows are retained in their position by the web. In a next step the bristle pins, at the region of their rear end, together with the webs, are cast in the material of the bristle support, so that the bristle pin rows are embedded in the bristle support. In this method, the bristle pins are molded into a cast support that is rigid and solid and therefore is incapable of directly delivering a powder mixture containing perfume or other active compositions to the hair being brushed.

U.S. Pat. No. 5,150,491 to Ikemoto discloses a hairbrush. A hairbrush is adapted to prevent static charging of the bristles and hair. It has a multiplicity of small holes formed in a conductive brush base that carries a row of antistatic members. The antistatic members are made stiff and are prevented from bending down, rendering the brush easy to draw through hair for smooth brushing. The conductive brush base is solid and cannot deliver perfume or other active compositions to hair, but merely eliminates the static present in the hair and bristles by conducting charges that are present.

U.S. Pat. No. 5,261,426 to Kellett, et al. discloses a hydrophilic foam pad for hair styling. The hair conditioning and styling pad is a shaped body of a resilient, open-celled, hydrophilic polyurethane foam matrix integrally incorporating an aqueous phase incorporating about 70-90% water, about 5-25% of a hair conditioning agent, and a nonionic surfactant. The bristles or tines of a brush contact the resilient pad and transfer the aqueous hair styling composition to the brush so that the composition is subsequently transferred to the hair as it is being styled. This styling device requires periodic contact with the resilient pad to recharge the bristles, and does not by itself deliver a powder mixture containing perfume or other active compositions to hair.

U.S. Pat. No. 5,626,099 to Staller, et al. discloses a therapeutic groomer. This hand-held grooming device grooms, massages, and provides magnetic therapy for animals. The device has a base that is configured to be hand-held. On the base, there is formed a grooming pad having projections adapted for grooming and massaging. The grooming pads are formed by either a plurality of parallely arranged strips each having magnetic properties or a single magnetic sheet. Each strip has its magnetic poles aligned uniformly so that its longitudinal ends are polar opposites. This therapeutic groomer does not deliver a powder with perfume or active compositions to the hair being groomed.

U.S. Pat. Nos. 6,450,127 and 6,543,388 to Willinger, et al. disclose an ergonomic handle for a grooming brush. This brush handle is formed with a continuously arched upper surface portion and a lower surface portion separated by a humped semicircular ridge. One of the lower arched portions forms a trigger grip for a single finger held in either a forehand or backhand grip. The handle is covered with a high friction material in the form of a contoured rubber or elastomeric sleeve, which is stretched over a molded plastic handle. These patents relate only to the shape of a handle of a hairbrush and do not disclose a hairbrush that delivers a powder mixture containing perfumes or other active ingredients to brushed hair.

A hairbrush commercially marketed by JW Pet Company (Hasbrouck Heights, N.J.) incorporates an ergonomic handle disclosed in U.S. Pat. Nos. 6,450,127 and 6,543,388. It uses a polymeric molded closed elliptical cavity which includes a thick elliptical rubber element carrying multitudes of metallic bristle pins with rounded tips. The distal end of the bristle pins opposed to the rounded tips carries a nail heads, which rests against and is glued to a thick rubber element using rubber cement or similar glue. The bristle pins in the rubber element form an air leak tight seal. The elliptical rubber element has a single hole appointed for discharging air. This elliptical rubber element with attached pins is squeezed into the closed elliptical cavity of a polymeric molded brush and the rubber element adopts a concave shape with the pins sticking out in a non-planar configuration. During use, pressure is applied to the pins in the middle portion of the elliptical rubber element of the brush. The air entrapped in the cavity formed by the rubber element and elliptical cavity is squeezed by the pressure applied thereby providing a springy feel, while the entrapped air is released through the single hole present in the elliptical rubber element. This brush has a single air outlet and discharges air entrapped in the elliptical cavity of the brush. It has no means available for delivering a powder mixture containing perfume or other active ingredients to the brushed hair.

U.S. Pat. No. 6,575,174 to Lee discloses a hair grooming brush. This hair grooming brush has a plurality of rows of curved wavy bristles, rather than traditional straight bristles commonly found on brushes and combs. The curvature of the bristles produces a springiness to the bristles when pressure is applied during the combing action. The springiness of the numerous rows of bristles translates into a massaging effect upon the hair and scalp. These springy bristles do not deliver a powder with perfumes or other active compositions to the hair being brushed.

There remains a need in the art for an easy-to-use hairbrush for brushing human or pet hair that delivers to the hair being brushed a powder that contains one ore more active ingredients, such as perfume or other active compositions. Further needed in the art is a hairbrush wherein the powder mixture containing perfume or other active compositions is released on demand.

SUMMARY OF THE INVENTION

The present invention discloses a lightweight brush comprising a brush base constructed with an internal cavity having a cavity area, a bottom surface having a first opening, and top surface having a second opening, respectively. The first cavity opening is located on the bottom surface of the brush base, facing the bristles of the brush. The second cavity opening is located on the top surface of the brush base, opposed to the bristles. A flexible, deformable membrane, preferably made from rubber, carries a multitude of bristles, and covers and tightly fits within the first opening of the internal cavity. The flexible, deformable membrane has a number of holes or apertures positioned between the bristles. The second cavity opening is fitted with a back cover, arranged so that it can be manually pushed or compressed inward and flexes back outward. A powder mixture is poured into the internal cavity, and disseminates therein over the flexible deformable membrane.

The powder mixture contains a desired perfume or fragrance and/or other active compositions such as insect repellants, hair shampoo, hair conditioning products, dye compositions, moisturizing ingredients, antibacterial compounds, and the like. When hair is brushed with the brush of the subject invention, the flexible membrane is deformed, causing the area of the internal cavity to lessen as the internal cavity is compressed. Compression of the internal cavity and air pressure causes the powder mixture to travel into the plurality of apertures of the deformable membrane and enter the bristles for delivery and release of the powder mixture and visa vie the fragrance or perfume and/or other active compositions, to the hair being brushed.

Alternatively, the back cover, which is positioned over the second opening, may be manually pushed inwards towards the bristles, thereby squeezing the internal cavity and pneumatically releasing the powdered mixture containing fragrance, or perfume and/or other active compositions through the apertures in the flexible deformable member. This method of releasing the fragrance and/or active compositions does not require the bristles to be in contact with the hair being brushed, and can therefore be used to treat selected areas of hair prior to vigorous brushing.

The bristles may be attached to the flexible deformable membrane by a number of methods. The bristles may be molded together with the deformable membrane, as a unitary body. In another embodiment, the bristles may be in the form of metallic pins with rounded ends that contact hair and may have a nail-like structure on the opposite end of the pin. In this embodiment, the pins are inserted through the flexible membrane through previously made holes with the rounded end penetrating the membrane, and each pin being inserted sufficiently to contact the nail head against the flexible deformable membrane. The nail heads of the metallic pins may be further held in place by the application of glue cement.

The brush is assembled first by inserting the flexible, deformable membrane with brush elements attached thereto into the first opening of the internal cavity of the brush base. The deformable membrane is entirely contained within the first opening, wherein the perimeter of the membrane rests against the inner wall which is defined by the internal cavity. Next, the powdered mixture containing perfume and/or active compositions is poured into the internal cavity, either directly through the second opening, or by way of engagement with the handle wherein the handle contains the powder mixture within a handle chamber therein. Upon entering the internal cavity, the powder mixture become disseminated and rests against the flexible deformable membrane. Where the back cover is removable, and when the powder mixture is poured into the internal cavity by way of the second opening, the back cover is inserted over the second opening and rests against the powder mixture mass within the internal cavity. When the powder mixture is exhausted, it is replaced in one embodiment, by removing the back cover, and pouring new powder mixture within the internal cavity, and again returning the back cover onto the brush base.

The powder mixture containing perfume and/or other active compositions including insect repellant, hair shampoo, hair conditioning products, dye compositions, moisturizing ingredients, antibacterial compounds, and the like is marketed as a replacement product. The powder mixture is sealed in a polymeric wrapper, or other packaging, and the user opens the packaging and pours the powder mixture directly into the internal cavity, or into the handle, depending on the embodiment of the brush structure of the subject invention being utilized.

Powder may be pneumatically released by compressing the internal cavity through compression of the flexible deformable membrane. Bristles display a springy action due to the flexible deformable membrane, which traps air within the internal cavity. Pushing the back cover in to release the fragrance, perfume and/or other active composition is resisted by the flexible deformable membrane, wherein the back cover is constructed so that it returns to the original position after release of the powder mixture containing fragrance perfume and/or other active composition. The powder mixture may be manually pneumatically released by compressing the internal cavity through compression of the back cover.

Significant advantages are realized by practice of the present invention. The key features of the pneumatic pet/people brush, include, in combination, the features set forth below:

1) a brush base with an internal cavity with a bottom surface having a first opening and top surface having a second opening, respectively;

2) the first opening appointed to receive a flexible deformable membrane;

3) the second opening appointed to receive a back cover;

3) the flexible deformable membrane having several rows of bristle elements and a plurality of apertures;

4) a powder mixture containing perfume, fragrance and/or other active compositions including insect repellants, shampoos, hair conditioning products, dye compositions, moisturizing ingredients, antibacterial compounds, and the like, being housed between the flexible deformable membrane and the back cover, respectively, within the internal cavity when the powder mixture is appointed to be released;

5) wherein the brushing action deforms the flexible deformable membrane, thereby squeezing the internal cavity and releasing the powder mixture containing perfume, fragrance and/or other active compositions through the apertures in the flexible deformable membrane;

6) wherein the user at any time may manually depress the back cover to squeeze the internal cavity, causing the area therein to become compressed and the powder mixture containing fragrance, perfume and/or other active compositions through the apertures in the flexible deformable membrane; and 7) wherein the user may periodically replace the powder mixture when same is exhausted;

whereby the user of the hairbrush of the subject invention is provided with the capability to saturate the hair being brushed with a perfume, fragrance and/or other active compositions including insect repellant, shampoos, hair conditioning products, dye compositions, moisturizing ingredients, antibacterial compounds, and the like through direct application of the powder mixture.

BRIEF DESCRIPTION OF THE DRAWINGS

The invention will be more fully understood and further advantages will become apparent when reference is had to the following detailed description of the preferred embodiments of the invention and the accompanying drawings, in which:

FIG. 5b is a top view of the back cover of the embodiment of the hairbrush shown in FIG. 5a;

FIG. 5c is a top view of the brush base, the internal cavity, the flexible deformable membrane with apertures for bristle elements of the embodiment of the hairbrush shown in FIG. 5a;

FIG. 6b is a top view of the removable handle of the embodiment of the hairbrush shown in FIG. 6a.

DETAILED DESCRIPTION OF THE INVENTION

This invention relates to a hairbrush for use with pets and humans. The hairbrush of the subject invention releases a powder mixture containing fragrance, perfume and/or other active compositions including insect repellent compositions, shampoo, hair conditioning and grooming products or dye compositions, moisturizing ingredients, antibacterial compounds, or the like.

The hairbrush is provided with a brush base that has an internal cavity with a bottom surface having a first opening and top surface having a second opening, respectively. The first opening receives a flexible deformable membrane which carries the bristle elements and has several apertures designed to release a powder mixture containing fragrance, perfume and/or active compositions during brushing or at the desire of the user at any time. The first opening receives the flexible deformable membrane with the bristles extending from the brush base, wherein the perimeter of the flexible deformable membrane rests against the interior wall defined by the internal cavity, thereby forming a leak tight seal. A powder mixture containing fragrance, perfume and/or other active compositions is poured within the internal cavity and disseminates and rests on the flexible deformable membrane. A back cover is inserted through the second opening. In another embodiment, the back cover is fixed to the brush base, and the handle is removable therefrom so that the powder mixture is received and housed within a chamber located inside the handle. When engaged, the powder mixture is released from the handle and enters the internal cavity of the brush base for further release into the bristles and onto the hair or fur being brushed.

Generally stated, the invention consists of a hairbrush which delivers a powder mixture containing fragrance, perfume and/or other active compositions to hair or fur during brushing or at any time by the user pressing the back cover. During the brushing action the bristles apply pressure against the central portion of the flexible deformable membrane flattening the membrane configuration. This flattening action directly compresses the internal cavity and applies pressure to the powder mixture so that the powder enters the apertures in the flexible deformable membrane and is released from the bristle elements onto the hair or fur being brushed. Alternatively, the powder mixture containing fragrance, perfume and/or other active compositions may be released at will by manually depressing the back cover which squeezes the internal cavity, decreasing the area thereof, and causes the powder mixture to enter the apertures in the flexible deformable membrane and, subsequently, the bristle elements for release onto the hair or fur.

The first opening may take any shape including elliptical, circular, rectangular, or square-shaped. The second opening may take any shape including elliptical, circular, rectangular, or square-shaped. The flexible, deformable membrane may take any shape including elliptical, circular, rectangular, or square-shaped. The back cover may take any shape including elliptical, circular, rectangular, or square-shaped. Any other suitable geometric shapes are within the scope of the present invention. Preferably, each of the first opening, second opening, flexible membrane, and back cover has the same general shape, respectively.

The flexible deformable membrane is preferably made from rubber typically with a thickness of 1/32 inch to 3/32 inch. The bristles are preferably metallic pins with a rounded end contacting hair and a nail head provided on its other end. These pins are inserted through previously made apertures in the flexible deformable membrane pushing the rounded end through the aperture until the nail head contacts the rubber surface. A glue cement may be applied to attach the bristles permanently to the flexible deformable membrane. Alternatively, the flexible deformable membrane and the bristles with the central aperture may be molded by an injection molding processes in one step to create a one piece unit which contains both the flexible deformable membrane and the bristles with central aperture.

In one embodiment, assembly of the hairbrush of the subject invention involves the steps comprising:
  1. The flexible deformable membrane is inserted through the first opening in the internal cavity of the brush base. Since the flexible deformable membrane has a slightly larger dimension than the first opening in the brush base, it has to be flexed to insert the flexible deformable membrane. At this stage, the bristles incorporated in the flexible deformable membrane point away from the internal cavity of the brush base. The perimeter of the flexible deformable membrane rests against the interior walls defined by the internal cavity.
2. The powder mixture containing fragrance, perfume and/or other active composition may be inserted from the second opening in the internal cavity of the brush base, and disseminates so that it rests on the flexible deformable membrane.
3. The back cover is slidably inserted over the second opening.
4. Now the assembled brush is ready to use. It delivers a perfume, fragrance and/or other active compositions via delivery of the powder mixture when the hairbrush is used to brush human or pet hair. Alternatively, the powder mixture containing the fragrance, perfume and/or other active composition may be released at will by manually depressing the slidable back cover. Once the perfume, fragrance and/or active composition is exhausted, the powder mixture is replaced with fresh powder by removing the back cover, pouring the powder mixture into the internal cavity, and re-inserting the back cover (wherein the cover is removable for addition of the powder mixture; as opposed to another embodiment wherein the handle is removable and receives and houses the powder mixture while the back cover is fixedly attached to the brush base).

Figure 1:
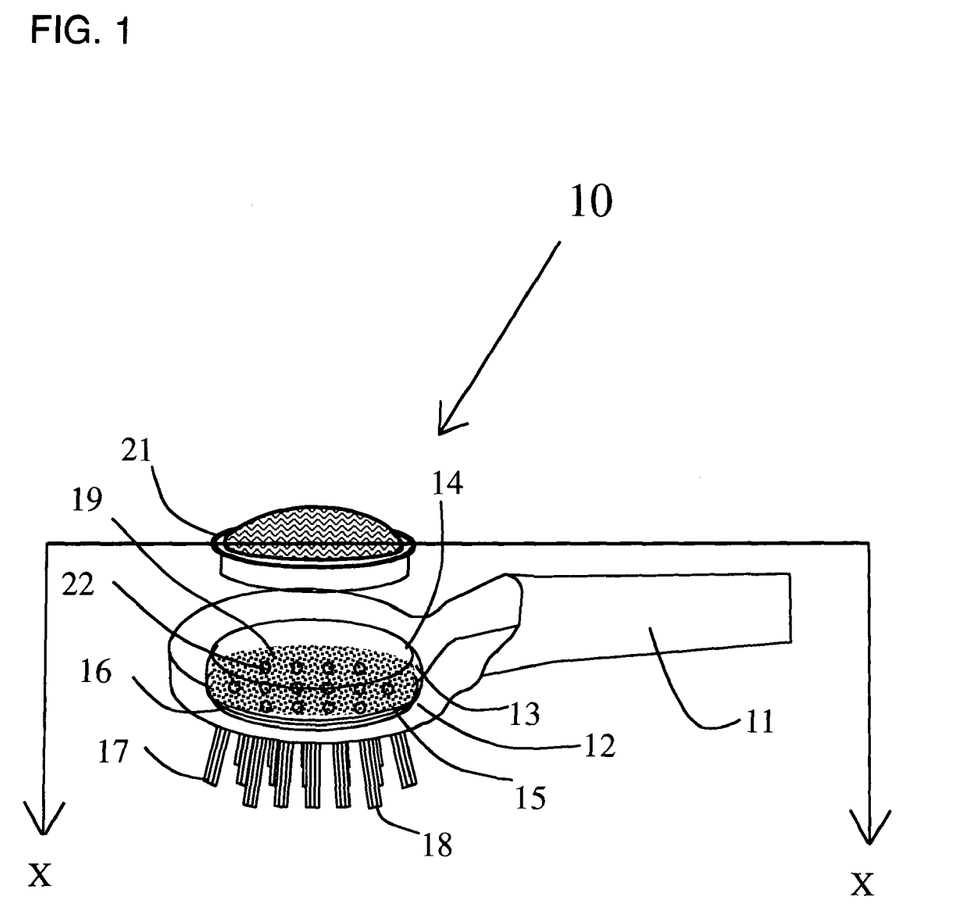
FIG. 1 is an illustration of an embodiment of the hairbrush of the subject invention showing the brush base, the internal cavity, the flexible deformable membrane with brush elements, the powder mixture containing perfume, fragrance and/or other active compositions therein, and the back cover.

FIG. 1 illustrates at 10 the hairbrush of the subject invention with a handle 11 and showing the brush base 12 with an internal cavity 13. The internal cavity 13 has a first opening generally marked 15 and a second opening generally marked 14. A flexible deformable membrane 16 with bristle elements 17 having apertures 18 is inserted within the first elliptical opening 15. The bristle elements 17 are shown in cross section, for clarity, to illustrate the central aperture within the bristle. The apertures in the flexible deformable membrane 16 are shown at 22. A powder mixture 19 containing perfume, fragrance and/or other active composition is inserted in the internal cavity 13 and disseminates over the flexible deformable membrane 16. The second opening 14 receives a back cover 21, which in this embodiment is removable for pouring powder mixture 19 into the internal cavity 13.

Figure 2A:
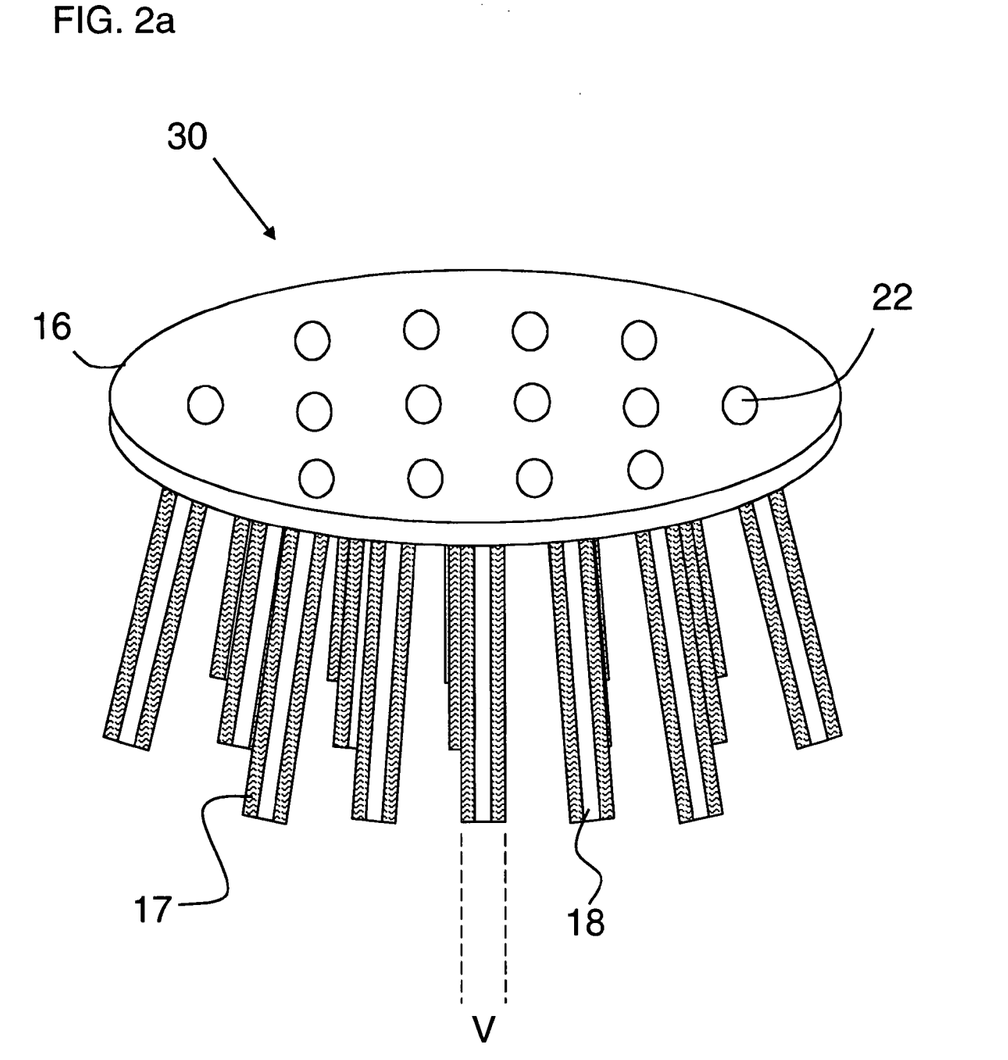
FIG. 2a is an illustration showing the flexible deformable membrane with attached bristles having a central aperture according to the first embodiment of the invention.
Figure 2B:
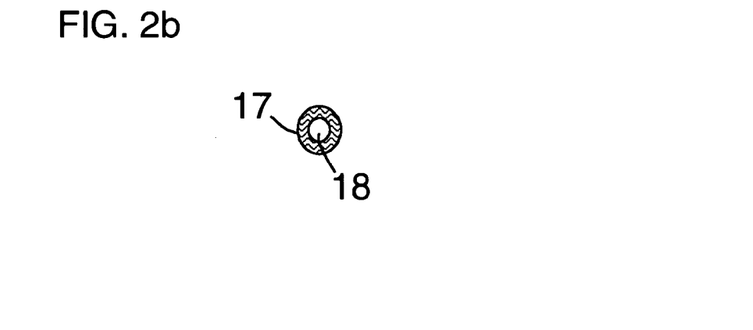
FIG. 2b shows the cross section of an individual bristle showing the central aperture.

FIG. 2a illustrates the flexible deformable membrane with bonded bristles 17, shown generally at 30. The flexible deformable membrane 16 has apertures 22 which are matched with the apertures 18 in the bristles 17. In this figure, the bristles are shown in cross section to illustrate clearly the central aperture. FIG. 2b shows the cross section of the bristle showing the central aperture 18 within the bristle 17 taken along plan V of FIG. 2a.

Figure 3:
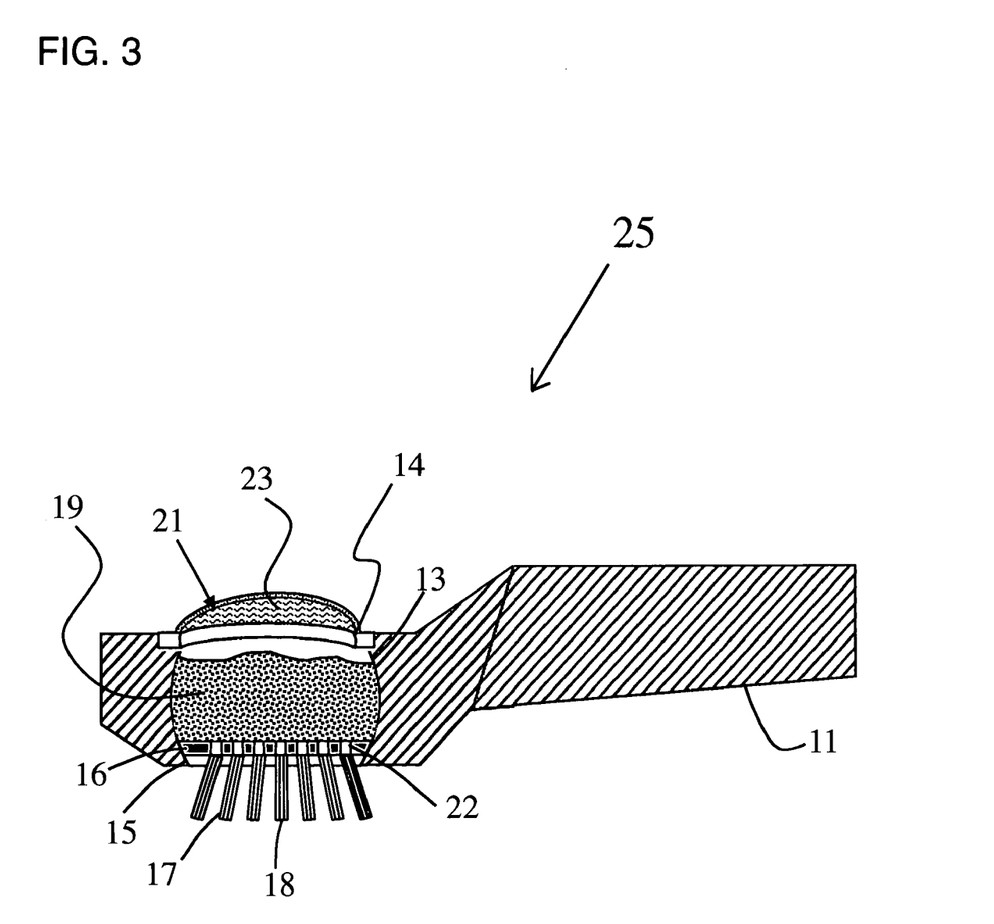
FIG. 3 is a cross section of the assembled hairbrush of the subject invention along cross section XX of FIG. 1 showing the relative locations of the flexible deformable membrane, the powder mixture, and the back cover.

FIG. 3 illustrates at 25 a cross section of the embodiment of the assembled hairbrush shown in FIG. 1, taken along cross section XX of FIG. 1. In its assembled configuration, the flexible deformable membrane 16 is entirely contained within the first opening 15. The flexible deformable membrane 16 is located against the inner wall defined by the internal cavity 13. Due to the larger dimension of the flexible deformable membrane 16, it protrudes the first opening 15 with a convex bulge. The bristle elements 17 (or pins), which are metallic pins with a rounded end, are inserted into the flexible deformable membrane 16, and have apertures 18. These pins have a nail head shaped end which rests against the flexible deformable membrane 16 and may further be permanently bonded to the flexible deformable membrane by glue cement. When this brush is used, the user grasps handle 11 and initiates brushing action; the bristle elements 17 being located at the center of the flexible deformable membrane 16 contact the hair of the person or pet first, thereby deforming the flexible deformable membrane 16. The internal cavity 13 becomes compressed and air enters the internal cavity via the apertures 18 of bristles 17. Pneumatic pressure and the compression of the internal cavity 13 causes the powder mixture 19 containing perfume, fragrance and/or other active compositions to become disturbed and to enter apertures 22 of flexible deformable membrane 16 and enter apertures 18 in the bristles 17. On the top side of the brush base 12 there is the back cover 21, which is inserted through the second opening 14 forming a deformable convex portion 23. When the hairbrush is used, pressure is applied to the flexible deformable membrane 16 which in turn squeezes internal cavity 13, thereby causing the powder mixture 19 to enter apertures 18 of bristle elements 17 and be released onto the hair or fur. An alternative path traversed by the powder upon application of pressure to the flexible deformable membrane 16 takes powder mixture 19 through apertures 22 and along the outside surfaces of bristle elements 17. In each case, the release of powder from internal cavity 13 occurs through a plurality of apertures 22 in the flexible deformable membrane 16. Alternatively, the powder mixture may be released at any time by the user manually depressing and pumping the convex portion 23 of back cover 19, even when the hairbrush is not brushing hair.

Figure 4:
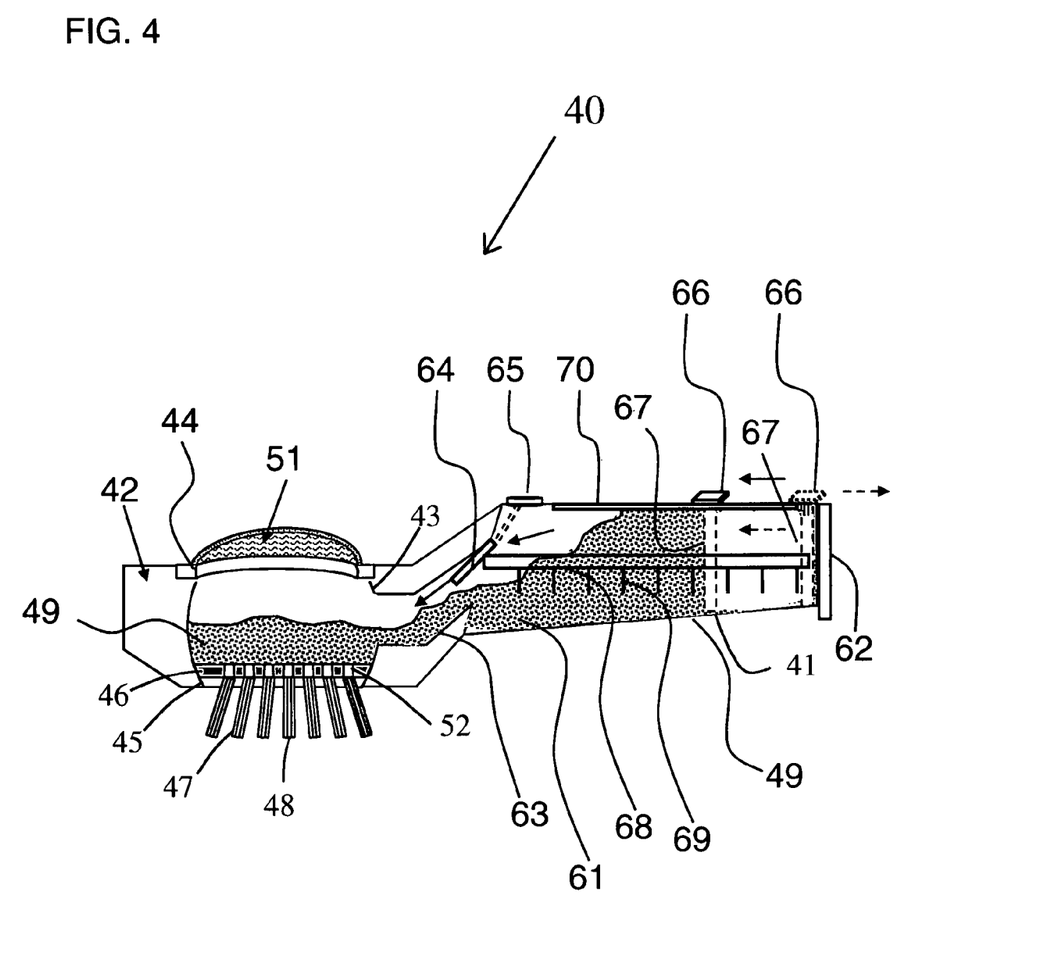
FIG. 4 is a cross section of an embodiment of the assembled hairbrush of the subject invention wherein the powder is housed within the handle of the brush.

FIG. 4 illustrates a cross section of an embodiment of the assembled hairbrush of the subject invention wherein the powder is housed within the handle of the brush, shown generally at 40. The brush 40 includes brush base 42 with an internal cavity 43. The internal cavity 43 has a first opening 45 and a second opening 44. A flexible deformable membrane 46 with membrane apertures 52 engaged with bristle elements 47 having apertures 48 is inserted within the first elliptical opening 45. The bristle elements 47 are shown in cross section, for clarity, to illustrate the central aperture within the bristle. Second opening 44 receives a back cover 51, which in this embodiment is fixed in second opening 44.

Continuing with FIG. 4, a handle 41 is attached to brush base 42. Handle 41 includes a handle chamber 61 and a hingedly capped opening 62 for insertion and housing of a powder mixture 49 therein. A pathway 63 connects handle 41 to brush base 42 and is appointed for entry of powder mixture 49 into internal cavity 13 of brush base 42. Pathway 63 includes a spring valve 64 engageable by way of a control button 65 to form an open and closed position. A slide member 66 on track 70 is provided with a handle shovel 67, so that powder mixture 49 can be pushed forward towards spring valve 64 and pathway 63. A measuring device 68 may be provided, such as a transparent screen with measurement indicia 69 there along so that the user can measure the quantity of powder mixture 49 that is to enter internal cavity 43 of brush base 42. Track 70 may have an opening at hingedly capped opening 62 so that slide member 66 and shovel 67 may be removed from the handle 41 at hingedly capped opening 62 and reinserted after the powder mixture 49 is poured into handle 41 so that the powder mixture 49 is packed into handle chamber 61. Transfer of the powder mixture 49 is achieved by the user engaging slide member 66 and visa vie sliding handle shovel 67 forward to push powder mixture 49 towards pathway 63. Control button 65 is then pressed so that spring valve 64 is engaged in the open position. Slide member 66 and handle shovel 67 are then slid forward until the desired amount of powder traverses pathway 63 and enters internal cavity 43 of brush base 42. After the desired amount of powder mixture 49 is ejected from handle 41 control button 65 is released and spring valve 64 closes so that no more of the powder mixture 49 escapes into pathway 63.

Figure 5A:
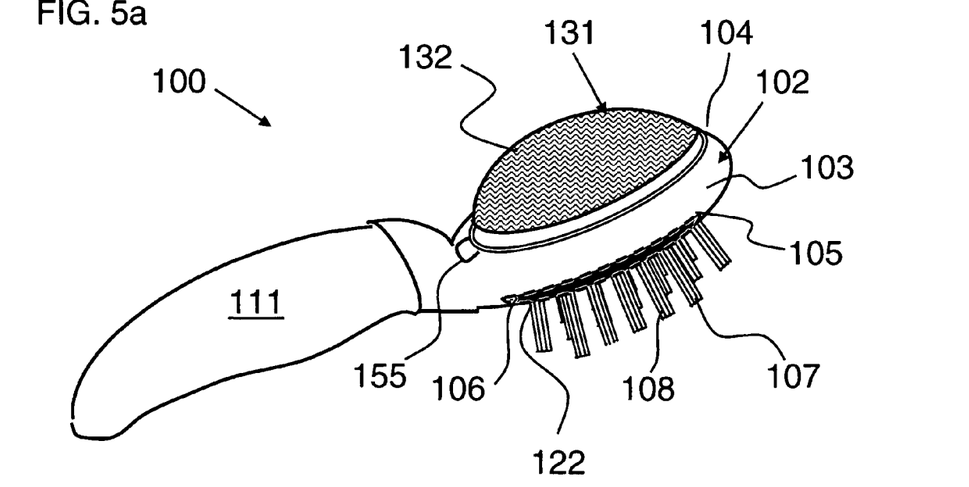
FIG. 5a is a top view of an embodiment of the hairbrush of the subject invention showing the brush base, handle, the flexible deformable membrane with brush elements, and the back cover.
Figure 5B:
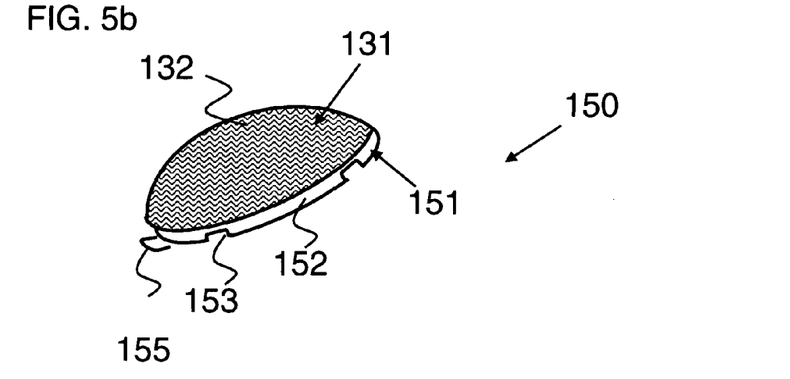
Figure 5C:
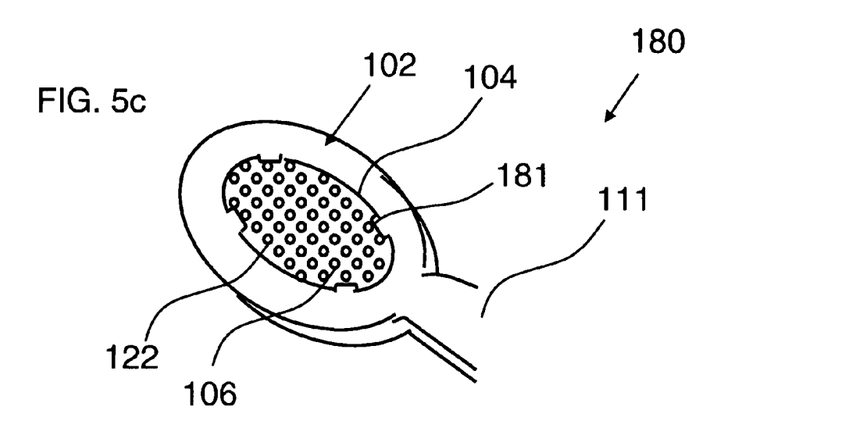

FIGS. 5a-5c illustrate various components of an embodiment of the hairbrush of the subject invention wherein the back cover is removable from the brush base so that the powder mixture can be poured into the internal cavity of the brush base. Specifically, FIG. 5a shows a top view of the brush in an assembled condition, showing the brush base, handle, the flexible deformable membrane with brush elements, and the back cover, generally at 100. FIG. 5b shows a top view of the back cover of the embodiment of the hairbrush as when the back cover is removed from the brush base, generally at 150. FIG. 5c shows a top view of a portion of the brush base, the internal cavity, the flexible deformable membrane with apertures for bristle elements wherein the back cover is removed therefrom, generally at 180. The brush 100 includes a handle 111 attached to a brush base 102 with an internal cavity 103. The internal cavity 103 has a first opening 105 and a second opening 104. A flexible deformable membrane 106 with membrane apertures 122 engaged with bristle elements 107 having apertures 108 is inserted within the first elliptical opening 105. The bristle elements 107 are shown in cross section, for clarity, to illustrate the central aperture 108 within the bristle. Second opening 104 slidably receives a back cover 131, which in this embodiment is removable from second opening 104 and slides and snaps therein. The perimeter of the flexible deformable membrane 106 rests against the interior wall defined by the internal cavity 103.

Continuing with FIGS. 5a-5c, back cover 131 includes a deformable convex portion 132, preferably composed of rubber that can be pressed downwardly and springs back into shape. Upon compressing of the deformable convex portion 132 the powder mixture enters apertures 122 of deformable member 106 and traverses apertures 108 of bristle elements 107 to be released into the hair or fur. Alternatively, the powder mixture passes through apertures 122 and along the outsides of bristle elements 107, making contact with the hair or fur. Back cover 131 is snapped onto first opening 104 by way of a base 151 having a rim 152 with notch grooves 153 therein that engage with notches 181 of first opening 104. A tab 155 is provided to disengage back cover 131 from first opening 104 of brush base 102 for removal of back cover 131 so that the powder mixture can be directly poured into the internal cavity 103.

Figure 6A:
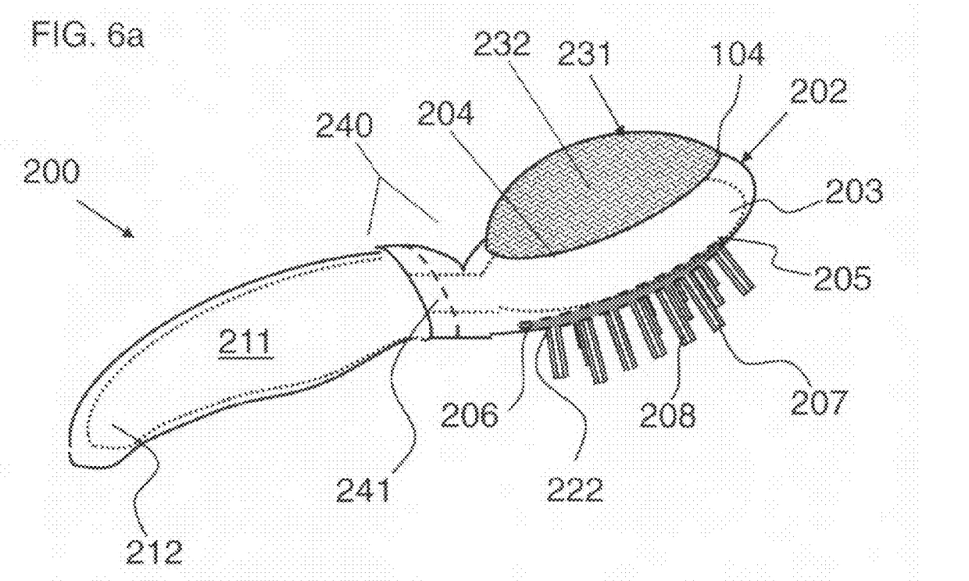
FIG. 6a is a top view of another embodiment of the hairbrush of the subject invention showing the brush base, the flexible deformable membrane with brush elements, back cover, and removable handle for housing the powder mixture.
Figure 6B:
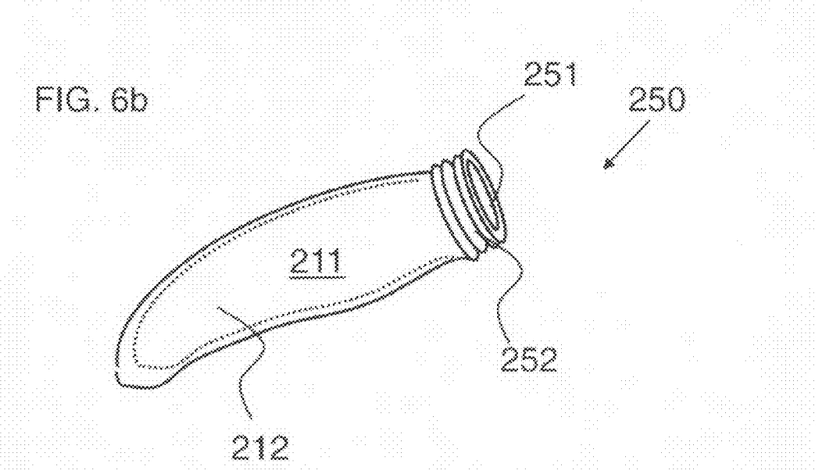

FIGS. 6a and 6b illustrate various components of an embodiment of the hairbrush of the subject invention wherein the back cover is fixedly mounted on the brush base and the handle is removable from the brush base so that the powder mixture can be poured into a handle chamber. Specifically, FIG. 6a shows a top view the hairbrush of the subject embodiment, showing the removable handle attached to the brush base, generally at 200. FIG. 6b shows a view of the handle removed from the brush base and appointed for receiving the powder mixture, generally at 250. Brush 200 includes a handle 211 removably attached to a brush base 202 with an internal cavity 203 having a first opening 205 and a second opening 204. Second opening 204 has a flexible deformable membrane 206 with membrane apertures 222 engaged with bristle elements 207 having apertures 208. Second opening 204 is fixed with a back cover 231, having a deformable convex portion 232 and being preferably composed of a deformable rubber. Handle 111 is removably attached to brush base 202. Brush base 202 comprises a handle attachment portion 240 having an aperture 241 that extends into internal cavity 203 of brush base 202. Handle 111 further comprises a handle chamber 212, a handle aperture 251, and attachment means 252 for removable attachment to brush base 202. Attachment means 252 of handle 211 engages with handle attachment portion 240 of brush base 202. Preferably attachment means 252 comprises threads and handle attachment portion 240 comprises corresponding grooves so that handle 211 can be screwed onto brush base 202.

Handle chamber 211 is appointed to house the powder mixture appointed to be transferred to internal cavity 203 of brush base 202. Transfer of the powder mixture from handle chamber 211 may be achieved by simply shaking or inverting the brush 200 (when handle 211 is attached to brush base 202) so that the powder mixture enters the internal cavity 203 of brush base 202. Alternatively, a slidable wall may be provided interstitially within either attachment means 252 of handle 211 or handle attachment portion 240 so that when the door is slid to an open position the powder is able to transfer to the brush base 202 and when the door is slid shut the powder remains housed within handle 211. Alternatively, handle 211 may be composed of a deformable or flexible material so that the handle 211 may be squeezed to allow transfer of the powder therein to the internal cavity 203 of brush base 202.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A hairbrush for humans and pets, comprising:
   a. a brush base with a handle and an internal cavity having a cavity area with a bottom surface having a first opening and top surface having a second opening, respectively;
   b. a flexible deformable membrane having bristles of a brush fixedly attached thereto and having a plurality of apertures located in-between said bristles, said first opening receiving said flexible deformable membrane;
   c. a powder mixture being placed over said flexible deformable membrane within said internal cavity;
   d. said second opening receiving a cover;
   e. said flexible deformable membrane is made from rubber having a thickness in the range of $1/32$ inch to $3/32$ inch;
   f. said bristles are metallic and have a first rounded end and a second nail head end, respectively, and wherein said flexible deformable membrane is permanently attached to said metallic bristles by inserting said rounded end and pushing said bristle until said nail head contacts said flexible deformable membrane,
   g. said handle comprises a handle chamber and a hingedly capped opening for insertion and housing of said powder mixture therein, wherein a pathway connects said handle to said internal cavity of said brush base;
   h. said pathway includes a spring valve engageable by way of a control button to form an open and closed position, and a slide member on a track, said slide member being provided with a handle shovel engageable therewith so that said powder mixture can be pushed forward towards said spring valve and pathway; and
   i. said handle is removably attached to said brush base, said brush base further comprising a handle attachment portion having an aperture that extends into said internal cavity of said brush base, and wherein said handle further comprises attachment means for removable attachment to said brush base, said handle chamber being appointed to house said powder mixture appointed to be transferred to said internal cavity;
   whereby brushing hair with said hairbrush deforms said flexible deformable membrane and squeezes said internal cavity so that said cavity area is compressed and said powder mixture is released through said apertures in said flexible deformable membrane, and pressing said cover squeezes said internal cavity so that said cavity area is compressed and said powder mixture is released through said apertures in said flexible deformable membrane even when said bristles of said brush are not in contact with hair.

2. A hairbrush as recited by claim 1, wherein each of said first and second openings, respectively, are elliptical, and said flexible deformable membrane is elliptical, and said cover is elliptical.

3. A hairbrush as recited by claim 1, wherein each of said first and second openings, respectively, are circular, and said flexible deformable membrane, is circular, and said cover is circular.

4. A hairbrush as recited by claim 1, wherein each of said first and second openings, respectively, are rectangular, and said flexible deformable membrane is rectangular, and said cover is rectangular.

5. A hairbrush as recited by claim 1, wherein each of said first and second openings, respectively, are square-shaped, and said flexible deformable membrane is square-shaped, and said cover is square-shaped.

6. A brush as recited by claim 1, wherein said powder mixture contains perfume, fragrance and/or other active composition comprising insect repellant, flea repellants and treatments, tic repellant, hair conditioning compositions, dye compositions, moisturizing ingredients, or antibacterial compounds.

7. A brush as recited by claim 1, wherein said powder mixture consists of active ingredients selected from a group consisting of insect repellants, flea and/or tic compounds, therapeutic or moisturizing compounds, or antibacterial compounds.

8. A brush as recited by claim 1, wherein said powder mixture consists of active ingredients selected from a group consisting of perfumes, fragrance, hair-conditioning and detangle products, shampoos, sun protection lotions, dye compositions, fragrances or other hair/fur/coat-care related products.

9. A brush as recited by claim 1, wherein said cover is removable and slidably fits within said second opening so that said powder mixture can be directly poured into said internal cavity.

10. A brush as recited by claim 1, wherein said cover is fixedly attached to said second opening.

11. A brush as recited by claim 1 comprising a measuring device including a transparent screen with measurement indicia there along located on said handle.

12. A brush as recited by claim 11, wherein said handle includes a shovel extending therein appointed to traverse said handle and push said powder mixture into said internal cavity of said brush base.

13. A brush as recited by claim 1, wherein said handle includes an control button engaged with an internal spring valve which forms an open position when said powder mixture is to enter said internal cavity of said brush base, and forms a closed position when said powder mixture is to remain in said handle chamber for later use.

14. A brush as recited by claim 13, wherein said handle further includes a press slide appointed with a shovel component appointed to push said powder mixture within said handle chamber into said internal cavity of said brush base when said internal spring valve is in said open position.

15. A method for creating a hairbrush for humans and pets that releases a powder mixture directly to hair or fur, comprising the steps of:
 a. creating a brush base with an internal cavity having a cavity area with a bottom surface having a first opening and top surface having a second opening, respectively;
 b. producing a flexible deformable membrane with bristles rigidly attached thereto and having a plurality of apertures;
 c. inserting said flexible deformable membrane into said first opening in said internal cavity;
 d. pouring said powder mixture through said second opening in said internal cavity, wherein said powder mixture is in contact with said flexible deformable membrane;
 e. slidably inserting a cover through said second opening in said internal cavity, wherein said cover is deformable;
 whereby brushing hair or manually depressing said cover releases said powder mixture and/or active composition to hair; whereby the brush base has a handle, said handle comprises a handle chamber and a hingedly capped opening for insertion and housing of said powder mixture therein, wherein a pathway connects said handle to said internal cavity of said brush base;
 said pathway includes a spring valve engageable by way of a control button to form an open and closed position, and a slide member on a track, said slide member being provided with a handle shovel engageable therewith so that said powder mixture can be pushed forward towards said spring valve and pathway; and said handle is removably attached to said brush base, said brush base further comprising a handle attachment portion having an aperture that extends into said internal cavity of said brush base, and wherein said handle further comprises an attachment means for removable attachment to said brush base.

16. A method for creating a hairbrush for humans and pets as recited by claim 15, wherein said powder mixture contains perfume, fragrance and/or other active composition comprising insect repellant, flea repellants and treatments, tic repellant, hair conditioning compositions, dye compositions, moisturizing ingredients, or antibacterial compounds.

17. A method for creating a hairbrush for humans and pets as recited by claim 15, wherein said powder mixture consists of active ingredients selected from a group consisting of insect repellants, flea and/or tic compounds, therapeutic or moisturizing compounds, or antibacterial compounds.

18. A method for creating a hairbrush for humans and pets as recited by claim 15, wherein said powder mixture consists of active ingredients selected from a group consisting of perfumes, fragrance, hair-conditioning and detangle products, shampoos, sun protection lotions, dye compositions, fragrances or other hair/fur/coat-care related products.

\* \* \* \* \*